United States Patent [19]

Boyle

[11] Patent Number: 5,350,549
[45] Date of Patent: Sep. 27, 1994

[54] SYNTHETIC AGGREGATE COMPOSITIONS DERIVED FROM SPENT BED MATERIALS FROM FLUIDIZED BED COMBUSTION AND FLY ASH

[75] Inventor: Michael J. Boyle, Aston, Pa.

[73] Assignee: Valley Forge Laboratories, Inc., Devon, Pa.

[21] Appl. No.: 47,674

[22] Filed: Apr. 15, 1993

[51] Int. Cl.$^5$ .................. B29C 47/00; C04B 7/12
[52] U.S. Cl. ..................... 264/40.4; 264/42; 264/140; 264/141; 264/176.1; 264/211.11; 264/211.12; 264/211.13; 264/333; 264/DIG. 49; 106/707; 106/710; 106/DIG. 1; 436/148; 436/164; 436/182
[58] Field of Search .................. 106/707, 710, DIG. 1; 264/140, 141, 40.4, 176.1, 211.12, 211.13, 239, 299, 333, 42, 211.11, DIG. 49; 436/148, 164, 182

[56] References Cited

U.S. PATENT DOCUMENTS

| | | | |
|---|---|---|---|
| 4,179,263 | 12/1979 | Jung et al. | 432/1 |
| 4,238,237 | 12/1980 | Jarrett et al. | 106/757 |
| 4,250,134 | 2/1981 | Minnick | 106/707 |
| 4,344,796 | 8/1982 | Minnick | 106/709 |
| 4,354,876 | 10/1982 | Webster | 106/709 |
| 4,377,414 | 3/1983 | Buschmann et al. | 106/709 |
| 4,397,801 | 9/1983 | Minnick | 106/708 |
| 4,430,126 | 2/1984 | Ackermann et al. | 106/796 |
| 4,586,958 | 5/1986 | Matsuura et al. | 106/707 |
| 4,717,337 | 1/1988 | Ichiyanagi et al. | 432/14 |
| 4,746,364 | 5/1988 | Kawai et al. | 106/708 |
| 4,840,671 | 6/1989 | Lynn et al. | 106/707 |
| 4,911,757 | 3/1990 | Lynn et al. | 106/707 |
| 4,985,081 | 1/1991 | Ahonen et al. | 106/772 |
| 5,084,102 | 1/1992 | Brouns et al. | 106/707 |
| 5,092,929 | 3/1992 | Sauer et al. | 106/707 |
| 5,100,473 | 3/1992 | Mitsuda et al. | 106/710 |
| 5,143,481 | 9/1992 | Schumacher et al. | 405/129 |
| 5,152,837 | 10/1992 | Rademaker | 106/707 |
| 5,166,109 | 11/1992 | Alpert et al. | 106/707 |

OTHER PUBLICATIONS

ERPI Report entitled "Commercialization Potential of AFBC Concrete: Part 2. vol. 2: Mechanistic Basis for Cementing Action." Jan. 1991.

Quarterly Technical Progress Report–"Development of Potential Uses for the Residue from Fluidized Bed Combustion Processes," prepared by L. John Minnick for U. S. Department of Energy. Mar. through May, 1981.

Quartely Tecnnical Progress Report–"Development of Potential Uses for the Residue from Fluidized Bed Combustion Processes," prepared by L. John Minnick for U.S. Department of Energy, Jun. through Aug., 1981.

Primary Examiner—Anthony Green
Attorney, Agent, or Firm—Woodcock Washburn Kurtz Mackiewicz & Norris

[57] ABSTRACT

Cementitious compositions useful as lightweight aggregates are formed from a blend of spent bed material from fluidized bed combustion and fly ash. The proportions of the blend are chosen so that ensuing reactions eliminate undesirable constituents. The blend is then mixed with water and formed into a shaped article. The shaped article is preferably either a pellet or a "brick" shape that is later crushed. The shaped articles are cured at ambient temperature while saturated with water. It has been found that if used sufficiently, the resulting aggregate will exhibit minimal dimensional change over time. The aggregate can be certified by also forming standardized test shapes, e.g., cylinders while forming the shaped articles and measuring the properties of the test shapes using standardized techniques including X-ray diffraction.

22 Claims, 1 Drawing Sheet

SYNTHETIC AGGREGATE COMPOSITIONS DERIVED FROM SPENT BED MATERIALS FROM FLUIDIZED BED COMBUSTION AND FLY ASH

The present invention relates to the manufacture of lightweight synthetic aggregates utilizing spent bed materials from the fluidized bed combustion of coal and limestone, and fly ash from pulverized coal combustion and compositions made thereby. In particular, the present invention relates to the identification and management of chemical and microstructural influences so that an aggregate product is obtained that is dimensionally stable over time.

BACKGROUND OF THE INVENTION

Approximately sixty percent of the electrical energy in the United States is produced by burning coal, the nation's most abundant energy resource. Renewed emphasis upon the burning of coal for this purpose results from the undesirable dependence on foreign oil and the recent concerns over the early decommissioning of nuclear power plants at forty percent of there intended service life. As new energy demands have focused on the use of coal as a fuel for power generation, the Clean Air Act has strongly influenced the selection of power generation technology. Using coal with high sulfur content requires flue gas desulfurization to reduce the $SO_x$ emission into the atmosphere. Generally, two approaches have been used to mitigate the emission problem. Existing utility-operated pulverized coal combustion boilers are retrofitted with a wet scrubber system using a lime slurry as the $SO_x$ sorbent. This approach produces a calcium sulfite and calcium sulfate sludge——and a disposal problem. A second approach, known as "internal desulfurization," requires the implementation of what is a relatively new technological advance in the electric power industry, fluidized bed combustion.

As a direct response to the energy crisis of the early 1970's, a 6 MMBtu atmospheric fluidized bed combustion unit was fired up in 1974. By 1987, the Fluidized Bed Research Institute of America reported new orders for 54 industrial fluidized bed combustion boilers and 5 utility fluidized bed combustion boilers. Fourteen units were operational in 1986. In a fluidized bed combustion boiler, crushed limestone and coal are fluidized by air pressure. After an initial ignition cycle, the limestone releases $CO_2$ by its proximity to the ignited coal. As the hot lime (CaO) passes through the ignition zone the $SO_x$ is captured on the surface of the lime particles. The total open porosity of the decarbonated limestone is utilized to convert a substantial amount of $SO_x$ into calcium sulfate (anhydrite). The reactants are eventually used up and the fluidized bed material is deemed to be "spent" and must be replaced. However, after the spent fluidized bed material is removed from the boiler furnace, the issue of its safe disposal must be addressed. A 160 Mw utility combustion boiler consuming 23 tons of coal per hour produces 6.7 tons of spent bed material per hour (160 tons in 24 hours). Due to the characteristics of the raw spent bed material, government regulations require controlled fill licensing and leachate monitoring of landfills to protect the environment from high alkali water contamination.

Thus, although fluidized bed combustion has several advantages, the negative aspects of the fluidized bed combustion technology can be summarized as follows:

1. The available limestone for cement and aggregate production is reduced due to the consumption of a non-renewable natural resource, e.g., at a rate of 207 to 276 tons/day in a 160 MW boiler, to meet emission standards.
2. Disposal sites must be acquired that meet the criteria for filling with spent bed material.
3. Licensing and monitoring of disposal sites is mandated.
4. The availability of future atmospheric fluidized bed combustion development sites is reduced due to negative environmental impact statements.

Thus, it would be desirable to create an environmentally sound and economically beneficial use for spent bed materials created by fluidized bed combustion.

In addition to the above-described drawbacks and problems associated with the use and disposal of spent bed materials from the fluidized bed combustion process, another problematic material created by the power generation industry and by other means is fly ash. Currently, fly ash is under-utilized as a recycled construction material and is typically treated and used as a landfill cap fill material, or in some instances is used as a filler in cement compositions. However, a long felt yet unmet need remains for ways to fully and usefully reuse this power generation byproduct.

It has been suggested that spent bed materials and fly ash can be combined to create a cementitious product. The cementitious potential produced by the combination of spent bed material hydrate, fly ash, and water is derived from the novel source of lime (CaO) in the spent bed materials and its recognized pozzolanic reaction with aluminum oxide ($Al_2O_3$) and silicon dioxide ($SiO_2$)-bearing fly ash. Additional cementitious behavior is associated with the chemical interaction of the sulfur ($SO_x$) released from coal during combustion, adsorbed by the decarbonated limestone, and subsequently involved with the aluminum oxide in the fly ash. This cementitious behavior is responsible for developing early compressive strength, however, it has been found that such materials exhibit unacceptable levels of expansion over time.

Concrete masonry units utilizing spent bed material and fly ash combined with Portland cement and stabilized road base mixtures are disclosed, respectively, in U.S. Pat. Nos. 4,397,801 and 4,250,134 both to Minnick et al. However, it is known that the compositions disclosed in these patents subsequently yielded unsatisfactory performance. See L. J. Minnick, "Development of Potential Uses for the Residue from Fluidized Bed Combustion Process", U.S., DOE, HCP/10415-55 (March–May, 1981).

The principal hydration products of a blend of spent bed materials and fly ash are gypsum ($CaSO_4$—$2H_2O$) and calcium sulphoaluminate, the precursor to ettringite "$6(CaO).3(SO_3).(Al_2O_3).31H_2O$". See "Commercial Potential of Atmospheric Fluidized Bed Combustion Concrete Part 2," The Electric Power Research Institute, EPRI GI-7122, Vol. 2, Proj. 2708-4 (January 1991). Further hydration and chemical interaction of the binder after initial set causes the formation of ettringite, which is the principal component of expansive and self-stressing cement (Types K, M and S), which are well known in the art.

Nevertheless, it would be desirable to provide a strategy for developing the full cementing capacity of spent bed material and fly ash while converting the disruptive expansive potential to manageable and desirable levels without the use of energy intensive methods, such as the atmospheric pressure steam treatment disclosed in U.S. Pat. No. 5,100,473—Mitsuda et al.

Accordingly, it is an object of the present invention to provide methods whereby spent bed materials and fly ash can be combined to form a product that is dimensionally stable and that can be used as an aggregate with cement in precast, or poured-in-place concrete application such as masonry or other products.

SUMMARY OF THE INVENTION

The present invention discloses methods of producing lightweight aggregate from spent bed material and fly ash comprising by selecting an optimal ratio of spent bed material and fly ash, for example by determining the chemical composition of spent bed material and fly ash, and mixing the spent bed material and fly ash to achieve a blend having the optimal ratio. Water is then added to the blend to form a blend product and the blend product is transferred to a forming operation, in which a shaped article is created. In accordance with the present invention the shaped article is then cured while maintaining the shaped article saturated with water. In certain embodiments the stoichiometric balance of a proportion of spent bed material and fly ash is determined and a ratio is selected wherein one or more ensuing reactions substantially exhaust any calcium hydroxide and calcium sulfate present in the spent bed material and fly ash. Most preferably, the ratio of spent bed material and fly ash is between about 1:0.4–1:0.8. The forming of shaped articles can be accomplished by molding, extruding or pelletizing. If the material is molded or extruded, the resulting shapes are preferably crushed after curing.

Additionally, standardized test shapes can also be formed to permit certifying the aggregate using the standardized test shapes. Thus, the present invention also discloses methods of certifying a synthetic aggregate formed from a blend of spent bed material and fly ash are thus also disclosed, wherein a plurality of standardized test shape samples are formed and one of said plurality is tested to determine an X-ray diffraction pattern, percent weight loss on ignition and oven dry weight. The step of testing another of said plurality is repeated after a curing period and the dimensional stability of the synthetic aggregate is determined.

Thus, in accordance with the present invention, it is preferred that methods of preparing cementitious compositions from the spent residue from a fluidized combustion bed and pozzolanic material include curing a shape formed from a hydrated blend of these materials at ambient temperature while maintaining the shape in a saturated condition. Most preferably, the curing the shaped article at ambient temperature while saturating the shaped article with water is carried out until the dimensional change of the shaped article is zero, or is at least less than about 0.0001 inches/inch per day.

The present invention discloses a cementitious composition comprising ettringite, gypsum, and calcium hydroxide formed from a blend of: spend bed material; pozzolanic material (preferably fly ash); and water, wherein the blend is cured while saturated with water until the dimensional change of the shaped article zero, or is at least less than about 0.0001 inches/inch per day or less. This composition can be in the form of a pellet, or can comprise a cured shape that is crushed. Preferably, the aggregate is formed from a blend of spent bed material and fly ash that includes calcium hydroxide and calcium sulphate, and the ratio of spent bed materials to fly ash is chosen from the stoichiometric balance of the chemical reactants. In such embodiments, when the blend is formed the amount of fly ash is preferably at least sufficient to substantially exhaust the calcium hydroxide and calcium sulphate during the formation of the hydrated forms of the aggregate reactants.

DETAILED DESCRIPTION OF THE PREFERRED EMBODIMENTS

Figure 1:
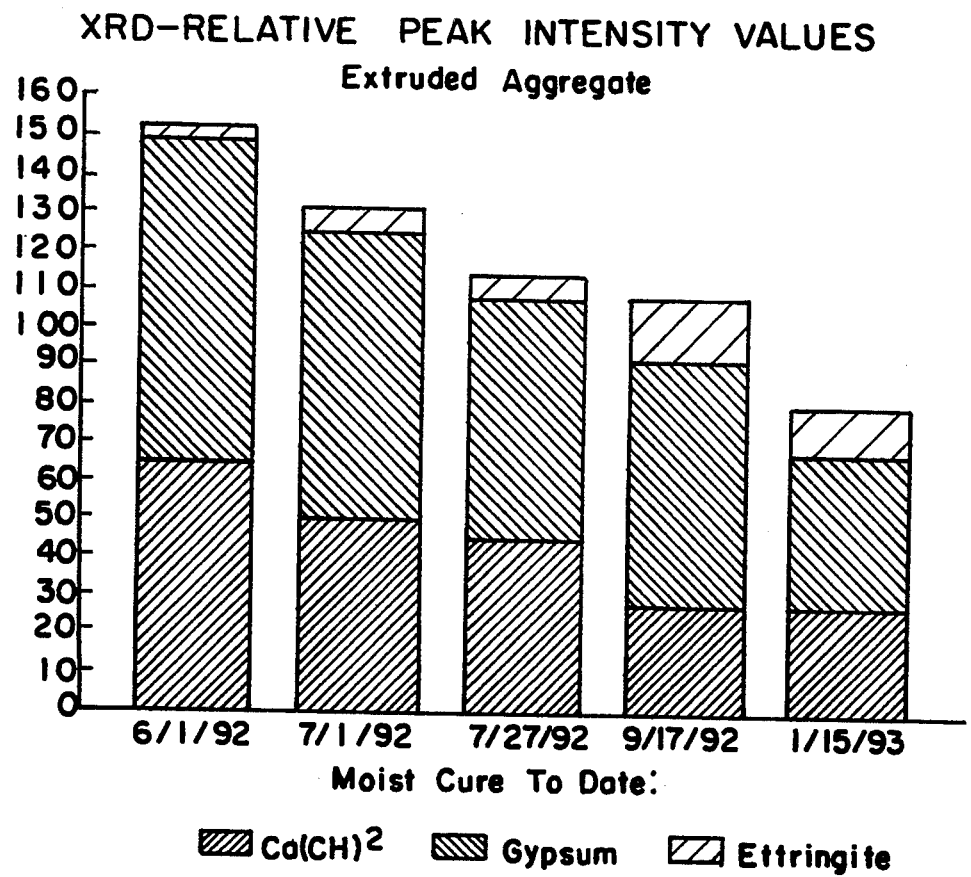
FIG. 1 is a bar graph representation of the relative peak intensity values obtained by X-ray diffraction for three of the major constituents of the products of the present invention as a function of time.

The present invention provides a process for producing lightweight aggregate for use in lightweight concrete products and aggregate for granular fill operations. As used herein, the term "aggregate" denotes a material that is in a form substantially equivalent to gravel, in that it can substitute for gravel in concrete or similar structural applications, whether the aggregate is formed as such by pelletizing or crushed from larger preformed shapes. The present invention utilizes spent bed materials from the atmospheric fluidized bed combustion process and conventional class F fly ash removed from the flue gas of pulverized coal boilers burning bituminous coal, which is not self-hardening. The spent bed material is preferably recovered from atmospheric fluidized bed combustion is initially in the anhydrous form of calcium oxide (CaO, quicklime) and calcium sulfate ($CaSO_4$, anhydrite). Various disposal schemes commonly include the quenching (slaking) of the spent bed material prior to landfilling. By controlling the quenching operation the spent bed material can be brought to a finely divided and flowable powder with approximately 10% moisture on a dry-weight-basis (dwb). For use in the present invention, the spent bed material must be slaked prior to use because the hydration reaction is highly exothermic, and the heat resulting from hydration must be dissipated prior to use in accordance with the present invention.

One aspect of the present invention is that the chemical composition of the starting materials must be determined. As an illustrative example, the compositions of spent bed material from four sources and fly ash from four sources are provided in Tables I and II as weight percentages:

TABLE I

| CHEMICAL ANALYSIS OF SPENT BED MATERIAL | | | | |
| --- | --- | --- | --- | --- |
| SOURCE | 1 | 2 | 3 | 4 |
| Loss on Ignition | 0.41 | 0.85 | 0.85 | 4.50 |
| $SiO_2$ | 10.62 | 4.98 | 5.70 | 10.10 |
| $Al_2O_3$ | 4.72 | 3.30 | 5.70 | 5.80 |
| $Fe_2O_3$ | 2.58 | 1.14 | 2.60 | 1.70 |
| CaO | 59.20 | 61.60 | 48.00 | 46.20 |
| MgO | 2.10 | 1.80 | 12.60 | 0.55 |
| $SO_3$ | 15.80 | 24.80 | 14.30 | 6.00 |
| Moisture | 0.02 | 0.05 | 0.04 | 17.50 |

TABLE II

| CHEMICAL ANALYSIS OF CLASS F FLY ASH | | | | |
| --- | --- | --- | --- | --- |
| SOURCE | 5 | 6 | 7 | 8 |
| Loss on Ignition | 3.20 | 4.42 | 9.68 | 2.50 |

TABLE II-continued

| CHEMICAL ANALYSIS OF CLASS F FLY ASH | | | | |
|---|---|---|---|---|
| SOURCE | 5 | 6 | 7 | 8 |
| $SiO_2$ | 40.36 | 52.25 | 41.89 | 49.38 |
| $Al_2O_3$ | 17.30 | 23.50 | 22.88 | 24.32 |
| $Fe_2O_3$ | 25.70 | 14.80 | 14.41 | 15.15 |
| CaO | 3.88 | 1.20 | 3.06 | 2.15 |
| MgO | 0.45 | 0.50 | 0.48 | 0.46 |
| $SO_3$ | 3.80 | 0.40 | 0.71 | <0.05 |
| Moisture | 12.32 | 0.58 | 14.47 | 15.20 |

The composition of the spent bed material and fly ash varies as a direct result of the composition of the raw combustion materials and the sorbent efficiency. In accordance with the present invention, a stoichiometric balance of the principal chemicals listed above is initially established. To drive the reaction in the desired direction, the chemical equation is unbalanced. In the following Example, a pair of chemical reactions have been selected from the several dozen known interactions of the cementitious mixtures found in Portland cement, as an illustration of the practice of the present invention.

EXAMPLE 1

Selecting spent bed material from source No. 2 in Table I and fly ash from source No. 8 in Table II, the chemical compositions as a ratio of the principal reactants is expressed as follows:

| Chemical Constituent | | Molecular Weight: | Moles/100 g S B M: (2) | Moles/100 g F A: (8) |
|---|---|---|---|---|
| $SiO_2$ | "Si" | 60.09 | 0.083 | 0.822 |
| $Al_2O_3$ | "A" | 101.96 | 0.032 | 0.239 |
| $Fe_2O_3$ | | 159.7 | 0.007 | 0.095 |
| CaO | "C" | 56.08 | 1.098 | 0.038 |
| MgO | | 40.32 | 0.045 | 0.011 |
| $SO_3$ | "S" | 80.07 | 0.310 | 0.001 |

Combining the spent bed material (SBM) and fly ash (FA) at a ratio of 1:0.6 produces a blended chemical composition as follows:

| Chemical Constituent | | Molecular Weight: | Moles/160 g of 1:0.6 Blend |
|---|---|---|---|
| $SiO_2$ | "Si" | 60.09 | 0.576 |
| $Al_2O_3$ | "A" | 101.96 | 0.175 |
| $Fe_2O_3$ | | 159.7 | 0.064 |
| CaO | "C" | 56.08 | 1.121 |
| MgO | | 40.32 | 0.051 |
| $SO_3$ | "S" | 80.07 | 0.310 |

The blend is predisposed to produce ettringite, $C_6S_3A \cdot 31H_2O$. The limiting component is 0.31 moles of $SO_3$ such that 0.103 moles of $C_6S_3A \cdot 31H_2O$ can be produced with 0.103 moles of "A" and 0.618 moles of "C" and an excess of water. The remaining constituents are 0.072 moles of "A" and 0.05 moles of "C". The remaining "C" will slowly combine with the $SiO_2$ to form belite, ($2CaO—SiO_2$).

Varying the ratio of spent bed material to fly ash produces varying results. The molecular ratios can be normalized and expressed relative to the concentration of $Al_2O_3$ ("A") as follows:

TABLE III

| | CHEMICAL COMBINATIONS EXPRESSED AS MOLECULAR RATIOS OF "A" | | |
|---|---|---|---|
| BLEND RATIO: | Spent Bed Material:Fly Ash 1:0.4 | Spent Bed Material:Fly Ash 1:0.6 | Spent Bed Material:Fly Ash 1:0.8 |
| REACTANTS: | | | |
| "A" ($Al_2O_3$) | 1.00 | 1.00 | 1.00 |
| "S" ($SO_3$) | 2.43 | 1.77 | 1.39 |
| "C" (CaO) | 8.72 | 6.39 | 5.06 |
| "Si" ($SiO_2$) | 3.22 | 3.28 | 3.32 |
| PRODUCTS: | | | |
| Ettringite (high-sulphate form $C_6S_3A*31H_2O$) | 0.81 | 0.58 | 0.46 |
| Calcium Silicate Hydrate | 1.93 | 1.43 | 1.15 |
| REACTANTS REMAINING: | | | |
| "A" ($Al_2O_3$) | 0.19 | 0.42 | 0.54 |
| "S" ($SO_3$) | 0.00 | 0.00 | 0.00 |
| "C" (CaO) | 0.00 | 0.00 | 0.00 |
| "Si" ($SiO_2$) | 1.29 | 1.85 | 2.17 |
| (CaO) | | | |

Selection of the optimum ratio of spent bed material to fly ash in accordance with the present invention therefore begins with the chemical considerations and must also achieve the physical compactability or cohesion necessary for shape forming process. It should be noted that the aluminum ($Al_2O_3$) and iron ($Fe_2O_3$) components are interchangeable. Additionally, it has been found that the significantly higher $Fe_2O_3$ content of source 5 in Table II unacceptably slowed the reaction. Since, however, the $SO_3$ content is the limiting reactant, the $Fe_2O_3$ can be ignored when present in amounts less than the $Al_2O_3$.

In this example, blending the spent bed material and fly ash at a ratio of 1:0.4 will produce the high sulfate form of the calcium sulphoaluminate, the precursor to ettringite. Although stoichiometric balance is considered, the yield of the desired end products is greatly improved by shifting the ratio of the reactants in favor of an excess of $Al_2O_3$. As the available sulphates become relatively low, the excess calcium hydroxide and calcium aluminate will produce the "low-sulphate" form or monsulphoaluminate ("$C_4A_3S$"). As the solubility conditions exhaust the sulphates while excess calcium hydroxide and calcium aluminate remain present, there is a serious concern with respect to the introduction of new sources of sulfur and the conversion of the "low-sulphate" form to the "high-sulphate" form with the accompanied volume change. This concern is shared with Portland cement applications where the concrete is in contact with sulphate bearing soils. The production of belite, (2CaO—SiO$_2$), is also very important as a relativley non-reversible reaction product found in portland cement.

Thus, in this Example, the 1:0.6 blend ratio is selected for this blend of spent bed material and fly ash because the chemical combinations will produce the "high-sulphate" form of calcium sulphoaluminate, the precursor to ettringite. The reactions will eventually exhaust the calcium hydroxide and calcium sulphate. As used herein "exhaust" means that one or more particular reactants are completely reacted. However, the present invention will also be useful for example, where a reaction is 90% or 95% complete, although the most preferred embodiments will completely exhaust the identified constituents. The serious concern with respect to the introduction of new sources of sulfur and the conversion of the "low-sulphate" form to the "high-sulphate" form is avoided due to the lack of available lime (CaO). The remaining reactants are in the form of aluminum oxide and silicon dioxide which serve as buffers to provide for stability and congruent solubility of the ettringite molecular structure. Blends containing greater quantities of fly ash than chemically needed will physically develop low cohesive properties which will hinder the forming process.

In accordance with the methods of the present invention, production of an initial shape for curing, crushing and grading into recognizable aggregate for commercial applications using the starting materials of Example I proceeds as follows:

EXAMPLE II

Spent bed material (Table II, Source No. 2) having a composition as set forth above was initially conditioned with water by quenching (slaking) the spent bed material to create a finely divided and flowable powder with approximately 10% moisture on a dry-weight-basis (dwb). The conditioned spent bed material can be stockpiled until the temperature does not pose a hazard, up to several weeks before use. Where conditioning facilities are not present, such as in atmospheric fluidized bed combustion plants with direct discharge into holding ponds, use of a conventional conveyor belt feed, pug mill with air collection, and filter bag dust control will be adequate.

The source for the fly ash (Table I, Source No. 8) should be chosen by undertaking both the chemical compatibility analysis as discussed above, and the fly ash should otherwise meet the standards found in ASTM C593—"Fly Ash and Other Pozzolans for use with Lime," which is incorporated herein by reference as if fully set forth.

The conditioned spent bed material is preferably blended with fly ash by balancing the volumetric feed of two conveyor belts into a pug mill or a barrel pelletizer with minor amounts of water for dust control. The spent bed material-fly ash blend can be stored (with low moisture content) for several days before forming brick or pellet shapes, or the blend of material may be used directly.

In accordance with another aspect of the present invention, controlled quantities of water are introduced with critical attention to water-to-blend contact time, such that 10 to 15 minutes or longer of contact time is provided. This is preferably accomplished by spraying water on the spent bed material-fly ash blend while it is on the conveyor belt that feeds the pug mill or a paddle mixer, while the blend is in the mill or the mixer, and again while the blend is on the belt that transports the resulting feed to a press, extruder or pelletizer. It is preferred that the water is added in an amount of about 10–20% by weight and most preferably 15% by weight. In addition to water, a commercially available plastisizing agent such as Daracem 100 Superplasticizer sold by W. R. Grace is preferably added at a rate of about 1 gallon per 50 tons. The plasticizing agent induces a level of cohesion that is helpful during pelletization and that is essential in brick pressing or brick extruding operations.

Product from the forming process is then preferably dropped into bins for transfer to a stockpile or is directly elevated to a stockpile for initial cure. A water sprinkler is preferably provided after 24 hours. The sizes of the pellets, "bricks" or other shapes formed by the above described process should be restricted to a maximum thickness of 4.0 inches (10 cm) to permit saturation. Use of energy intensive methods of cure such as atmospheric pressure steam treatment and 100° F. cure disclosed in the prior art should be avoided. See U.S. Pat. No. 4,250,134—Minnick et al. Application of sealants or sodium silicate solutions taught in the prior art should also be avoided. See U.S. Pat. No. 5,100,473—Mitsuda et al.; U.S. Pat. No. 4,250,134—Minnick et al.

In accordance with another aspect of the present invention, it has been found that the brick or pellet shapes produced by the methods described above are not suitable for use as aggregates unless they are properly cured as described below. Curing in accordance with the present invention is essential to ensure that the resulting aggregate material is dimensionally stable over time, and is preferably accomplished by saturating the shapes with water and is preferably carried out at ambient temperature. As will be readily appreciated, if an aggregate is not dimensionally stable and is introduced into a concrete product, disintegration of the product is inevitable and will lead to catastrophic failure. However, in accordance with the present invention, it has now been discovered that proper curing will produce a composition that has an appropriate microstucture to make a stable aggregate.

|  | Aggregate Age at Casting | Durability Factor |
| --- | --- | --- |
| Extruded | 97 days | 87% |
| Aggregate | 100 days | 93% |
| Pelletized | 77 days | (Failed @ 114 cycles) |
| Aggregate | 146 days | 98% |

ASTM C260 Minimum Durability Factor 80%

The identification and management of chemical and microstructural influences to assist in determining proper curing begins with the establishment of standardized production samples. The standard method for measurement of expansion of shrinkage-compensating cement concrete requires the preparation of 3"×3"×10" cast samples with ⅜" all-thread steel reinforcement through the long axis. Those of ordinary skill in the art will be familiar with the standards and procedures set forth in ASTM C 878 and that document is incorporated herein by reference in its entirety, as if fully set forth. The standard procedure establishes the initial sample length and subsequent values to the nearest 0.00001 inches per inch. Therefore, samples preferably are molded from the freshly pressed, extruded or pelletized blend product described above using molds such as those described in ASTM C 878, without the longitudinal reinforcement required by that standard. Under accepted practice, certification of a cured aggregate product is permitted by examination of companion samples of similar age, cure history and initial density to determine X-ray diffraction (XRD) pattern, percent weight loss on ignition, and oven dry weight, over an extended cure period. In accordance with the present invention it has been found that dimensional stability is enhanced with extended moist cure.

Referring now to FIG. 1, there is shown a plot of the relative peak intensity of X-ray diffraction studies performed at indicated time intervals. The results reflect the chemical alternations which are in progress during the wet cure period described above with reference to the methods of the present invention. Two factors influence the apparent progressive reduction of the calcium hydroxide and calcium sulphate relative peak intensity. First, the formation of non-crystalline or semi-crystalline calcium silicate hydrate reduces the calcium hydroxide content. Second, as expected, the formation of calcium sulphoaluminate, the precursor to ettringite, is clearly increasing with minor subsequent fluctuations. The subsequent dilution of each of the crystalline concentrations due to non-crystalline or semi-crystalline formations must also be considered as FIG. 1 is examined.

Figure 2:
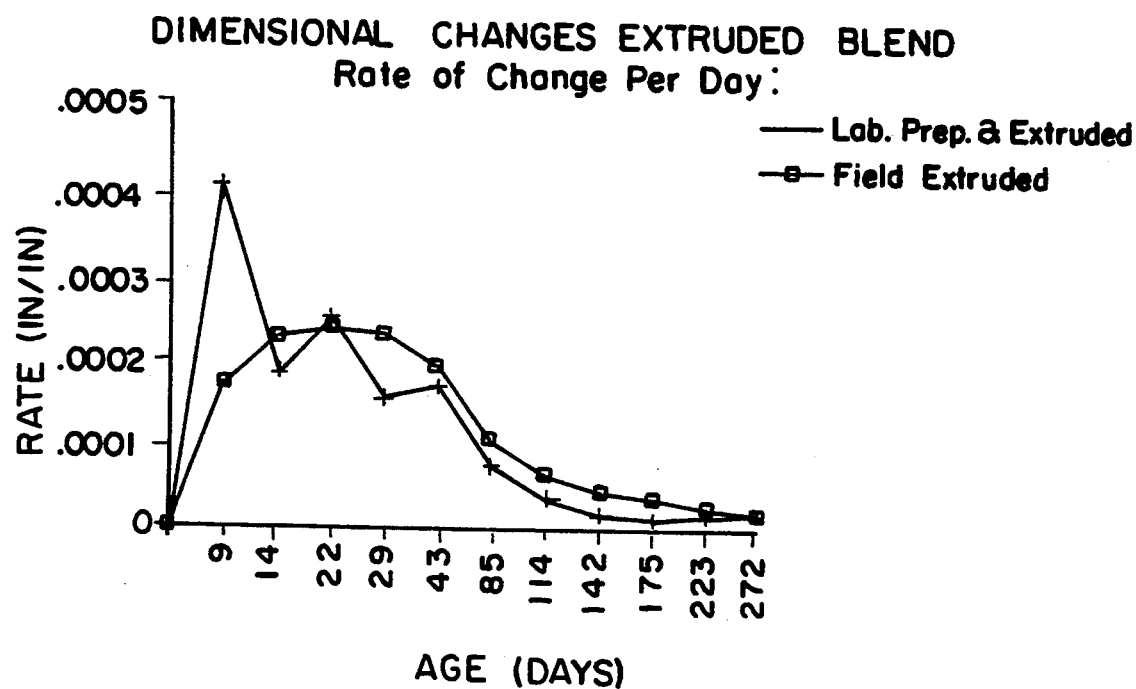
FIG. 2 is a plot of the dimensional changes of two samples of material made in accordance with the present invention as a function of time.

It has been shown by experiment that, under some conditions, no expansion occurs during ettringite formation. See Midgley and Pettifer, "Microstructure of Hydrated Supersulfated Cement," Cem. Concrete Res. 1, pp. 101–104 (1971). The blend made in Example 1, however, is expected to expand and it is necessary to monitor companion 3"×3"×10" cast samples for dimensional changes and weight gain during the wet cure process. Referring now to FIG. 2, the concurrent dimensional changes of companion samples is shown. It can be seen that both samples of material exhibited early expansion, but by about 43 days the rate for both samples correlates well and begins to fall. By 85 days the dimensional change is about 0.0001 inches per inch and continues to decrease with time. After 272 days, the dimensional change is nearly zero. Continuing with Example 1, the 1:0.6±0.05 spent bed material:fly ash blend as described above was used to prepare both extruded brick and pelletized shapes in sufficient quantities to participate in full scale demonstrations. The processes of forming extruded bricks and pelletizing materials of this type are well known in the art:

A. Concrete Masonry Units
 (672) masonry blocks with extruded aggregate
 (623) masonry blocks with (pelletized aggregate)
 (2) masonry walls, 70 ft. long 5½ to 6 ft. high.
B. Light Weight Concrete
 (6) precast concrete noise barrier wall panels (extruded and pelletized aggregate) 12 ft.×2 ft.×4 in.
 (2) prestressed concrete beam/deck unit Double "T's" (extruded aggregate) for parking garage (41 ft.×10 ft., 34 inch deep) and highrise office bldg. (27 ft.×8 ft., 12 inch deep).

Masonry block walls, precast concrete noise barriers and prestressed concrete beam/deck units were exposed to prevailing weather through the '92–'93 winter. Petrographic examination of drilled concrete core samples taken from the noise barrier concrete revealed no evidence of distress. Test walls will become a permanent addition to the facilities while the prestressed beam/deck units will be load tested to failure to verify structural capacity. The field demonstrations of concrete products and structures have been very successful.

Tables No. IV–VIII, summarize the materials, proportions, and test results. After 134 to 204 days of wet cure the materials had results as follows:

TABLE IV

MASONRY CONCRETE AGGREGATE GRADATIONS
EASTERN INDUSTRIES, EPHRATA, PA

| FINE AGGREGATE SOURCE: | EASTERN | EASTERN | EASTERN | |
|---|---|---|---|---|
| COARSE AGGREGATE SOURCE: | EASTERN | NO. 2 & NO. 8 | NO. 2 & NO. 8 | |
| SAMPLE: | — | 4-25-92 | 5-01-92 | |
| TYPE: | LIMESTONE | EXTRUDED | PELLETIZED | |

| PARTICLE SIZE DISTRIBUTION | | | | |
|---|---|---|---|---|
| SIZE | PERCENT PASSING SIEVE | | | ASTM C 136-84a OPTIMUM RANGE ⅜"–0 |
| ½ in. | 100.0 | 100.0 | 100.0 | 100.0 |
| ⅜ in. | 100.0 | 96.1 | 95.1 | 90–100 |
| NO. 4 | 86.7 | 71.0 | 71.9 | 65–90 |
| NO. 8 | 56.2 | 57.1 | 59.3 | 35–65 |
| NO. 16 | 33.6 | 35.5 | 39.5 | — |
| NO. 50 | 15.2 | 10.4 | 11.7 | 10–25 |
| NO. 100 | 10.7 | 3.3 | 0.7 | 5–15 |

TABLE V

MASONRY CONCRETE PRODUCTION PROPORTIONS
SEPTEMBER 12, 1992 AND NOVEMBER 25, 1992

| Mix Designation: SOURCE: SAMPLE: TYPE: | EASTERN LIMESTONE | NO. 2 & NO. 8 4-25-92 EXTRUDED | NO. 2 & NO.8 5-01-92 PELLETIZED |
|---|---|---|---|
| Cement, Type II, lbs/yd³ (Allentown, PC) | 350 | 564 | 564 |
| Fine Aggregate, lbs/yd³ (Eastern Industries) | 1200 | 1200 | 1200 |

TABLE V-continued

MASONRY CONCRETE PRODUCTION PROPORTIONS SEPTEMBER 12, 1992 AND NOVEMBER 25, 1992

| | | | |
|---|---|---|---|
| Coarse Aggregate, lbs/yd$^3$ | 2600 | 1700 | 1755 |
| Water* | * | * | * |
| Admixtures | None | None | None |
| Blocks Per Batch: | 109 | 112 | 109 |
| Total Number Cast: | 109 | 672 | 623 |

*Note:
consistency of the non-plastic mixture determined by operator

TABLE VI

MASONRY CONCRETE EVALUATION - ASTM C 140

| Aggregate Mix Designation: | EASTERN | | NO. 2 | NO. 8 |
|---|---|---|---|---|
| SOURCE: | Limestone | Solite | Cementitious | Hydrate |
| SAMPLE: | — | — | 4-25-92 | 5-01-92 |
| TYPE: | Crush Stone | Expanded Shale | Extruded | Pelletized |
| Dry Weight per Block: | 35.4 # | 32.2 # | 32.1 # | 27.6 # |
| Net Volume (ft$^3$): | 0.277 | 0.296 | 0.299 | 0.270 |
| Bulk Density (dry) (*lbs/ft$^3$): | 127.9 | 109.2 | 106.9 | 102.4 |
| Absorption: | 9.4% | 13.0% | 15.3% | 20.8% |
| Net Area: | 52.9% | 56.1% | 57.3% | 51.4% |
| Compressive Strength:* | 1520 psi | 1510 psi | 1180 psi | 1458 psi |

Block Size: 8" × 8" × 15.5"
All test results are based on the average of three tests.
ASTM C90 requires a minimum compressive strength of 1000 psi

TABLE VII

PRECAST CONCRETE NOISE BARRIER PRODUCTION PROPORTIONS & LAB TEST DATA
Superior Precast Concrete September 24, 1992

| | Extruded | Pelletized |
|---|---|---|
| Mix Designation | | |
| Source: Spent Bed Material No. 2 | | |
| Sample: Fly Ash No. 8 | 4-25-92 | 5-01-92 |
| Type: | Extruded, Crushed & Graded | Pelletized & Graded |
| Weight: | Lbs/yd$^3$ | Lbs/yd$^3$ |
| Cement, Type II, (Allentown, PC) | 759 | 785 |
| Fine Aggregate, (ssd) (Superior Precast Concrete) | 1218 | 1187 |
| Coarse Aggregate (soaked) | 1242 | 1305 |
| Added Water: | 250 lbs/yd$^3$ 30 gal. | 220 lbs/yd$^3$ 26.4 gal. |
| A-E-A, ozs: (W. R. Grace, Daravair) | 9.4 | 9.7 |
| HRWRA, ozs: (W. R. Grace, No. 19) | 132 | 137 |
| Concrete Temperature (°F.): | 76 | 74 |
| Slump (inches): | 1¾" | 2" |
| Air Content (%): | 3.4% | 4.3% |
| Wet Unit Wt. (lbs/ft$^3$) | 128.8 | 129.9 |
| Laboratory Test Data | | |
| COMPRESSIVE STRENGTH (PSI) | | |
| (Average of two test cylinders (6" × 12")) | | |
| Field Cured: | | |
| 4 Days: | 3210 | 3210 |
| 28 Days: | 4130 | 3955 |
| Lab Cured: | | |
| 7 Days: | 3520 | 3440 |
| 14 Days: | 3885 | 3820 |
| 28 Days: | 4350 | 4145 |
| 42 Days: | 4630 | 4170 |
| 42 Days, Unit Weight (lbs/ft$^3$): | 121.5 | 122.9 |
| Bond Strength of a No. 6 Reinforcing Steel Bar with 12 inches of Concrete Imbedment: | | |
| Maximum Load (lbs): | 37,250 | 43,000 |
| Maximum Steel Stress (psi): | 84,660 | 97,730 |
| Load to Critical Bond Strength (lbs): | 23,560 | 26,210 |
| Steel Stress at Critical Bond Strength (psi): | 55,545 | 59,568 |
| Bond Strength Corresponding Loaded End Slip of 0.01" (psi): | 830 | 927 |
| Bond Strength Corresponding Free End Slip of 0.002" (psi): | (1320) | 1340 |
| Maximum Free End Slip (inches): | 0.001 | 0.004 |

TABLE VIII

PRESTRESSED CONCRETE DOUBLE "T" CONSTRUCTION
High Concrete Structures Inc. Denver, PA

| | High Rise: 26 ft. 6.5 in × 8 ft. 12" depth of double "T: Stressed to 27.0 kips/strand Typical Proportions ft$^3$ | | Parking Garage: 40 ft. 11 in. × 10 ft. 34" depth of double "T" Stressed to 34.8 kips/strand | | |
|---|---|---|---|---|---|
| MIX CODE: | Proportion | | Batch Weights | Computed lbs/yd$^3$ | ft$^3$ |
| | | | Nov. 18, 1992 | | |
| Cement: Allentown Type III | 658 | 3.35 | 755 | 758.2 | 3.8571 |
| Silica Fume | 20 | .1438 | 30 | 30.1 | .2194 |
| Fine Aggregate: (ssd) | 1207 | 7.36 | 1252.4 | 1257.7 | 7.6634 |
| Coarse Aggregate: (ssd) | 1834 | 10.53 | — | — | — |
| Lancaster Lime & Stone: No. 2 & No. 8 (4-25-92): | — | — | 1030 | 1034.3 | 9.5769 |

TABLE VIII-continued

PRESTRESSED CONCRETE DOUBLE "T" CONSTRUCTION
High Concrete Structures Inc. Denver, PA

| MIX CODE: | High Rise:<br>26 ft. 6.5 in × 8 ft.<br>12" depth of double "T:<br>Stressed to 27.0 kips/strand<br>Typical Proportions ft$^3$<br>Proportion | | Parking Garage:<br>40 ft. 11 in. × 10 ft.<br>34" depth of double "T"<br>Stressed to 34.8 kips/strand<br>Batch<br>Weights | Computed<br>lbs/yd$^3$ | ft$^3$ |
|---|---|---|---|---|---|
| Added Water: | 250 | 4.01 | 287.5 | 288.7 | 4.6262 |
| A-E-A, ozs: | 6 | 1.62 | 10 | 10.0 | .9450 |
| (Sika Air) | | | | | |
| HRWRA, ozs: | 130 | .1356 | 130 | 130.5 | .1466 |
| (W. R. Grace, WRDA #19) | | | | | |
| TOTAL WEIGHT: (lbs) | 3968 | | 3355 | 3369 | |
| Unit Wt: (Theoretical)(lbs/ft$^3$) | 146.20 | | | 124.61 | |
| Yield (ft$^3$) | 27.1 | | | 27.0 | |
| Unit Wt.: (Test)(lbs/ft$^3$) | — | | | 125.1 | |
| Slump (inches) | 5" | | | 6" | |
| Air Content (%) | 6.8% | | | 3.5% | |
| | | | | Nov. 20, 1992 | |
| Cement: Allentown Type III | | | 8480 | 687.1 | 3.4958 |
| Silica Fume | | | 410 | 33.2 | .2420 |
| Fine Aggregate: (ssd) | | | 13456.3 | 1090.4 | 6.6440 |
| Lancaster Lime & Stone: | | | — | — | — |
| No. 2 & No. 8 (4-25-92): | | | | | |
| Added Water | | | 13770 | 1115.8 | 10.8328 |
| A-E-A, ozs: | | | 3535.8 | 286.5 | 4.5914 |
| (Sika Air) | | | | | |
| HRWRA, ozs: | | | 157.5 | 12.8 | 1.0800 |
| (W. R. Grace, WRDA #19) | | | 1560 | 126.4 | .1451 |
| TOTAL WEIGHT: (lbs) | | | 39652 | 3213 | |
| Unit Wt.: (Theoretical)(lbs/ft$^3$) | | | | 118.86 | |
| Yield: (ft$^3$) | | | | 27.0 | |
| Unit Wt.: (Test)(lbs/ft$^3$) | | | | 118.0 | |
| Slump (inches) | | | | 6" | |
| Air Content (%) | | | | 4.0% | |

Although certain embodiments of the present invention have been set forth with particularity, these embodiments are meant to be illustrative of the general principles of the present invention and do not limit its scope. Upon review of this specification, those of ordinary skill will immediately apprehend numerous variations, alternate applications and further adaptations of the principles of the present invention. Therefore, in order to ascertain the true scope of the present invention, reference should be made to the appended claims.

What is claimed is:

1. A method of producing lightweight aggregate of spent bed material from a fluidized bed combustion process and fly ash comprising the steps of:
    selecting an optimal ratio of spent bed material and fly ash;
    mixing the spent bed material and fly ash to achieve a blend having the optimal ratio;
    adding water to the blend to form a blend product;
    transferring the blend product to a forming operation;
    forming a shaped article;
    saturating the shaped article with liquid water; and
    curing the shaped article while maintaining the shaped articles saturated with liquid water.

2. The method of claim 1, wherein the step of selecting an optimal ratio comprises determining the chemical composition of spent bed material and fly ash.

3. The method of claim 2, further comprising the steps of: determining a target stoichiometric balance between chemical reactants in the spent bed material, the reactants comprising CaO and CaSO$_4$, and in the fly ash, the reactants comprising SiO$_2$ and Al$_2$O$_3$; and selecting a weight ratio of spent bed material and fly ash to produce a mole ratio of CaO to Al$_2$O$_3$ of between about 1.0:0.4 and 1.0:0.8, whereby upon hydration any CaO and CaSO$_4$ present in the spent bed material and fly ash are substantially exhausted by ensuing chemical reactions.

4. The method of claim 1, wherein the weight ratio of spent bed material and fly ash is between about 1:0.4–1:0.8.

5. The method of claim 1, wherein the step of mixing includes introducing controlled quantities of water for at least 15 minutes to optimize water-to-blend contact, wherein a solution of the soluble constituents reaches equilibrium.

6. The method of claim 5, wherein the step of introducing controlled quantities of water comprises adding about 15% water by weight.

7. The method of claim 1, further comprising the step of adding a plasticizing agent just prior to the step of transferring the blend to a forming operation.

8. The method of claim 1, wherein the step of forming a shaped article comprises molding.

9. The method of claim 1, wherein the step of forming a shaped article comprises extruding.

10. The method of claim 1, wherein the step of forming a shaped article comprises pelletizing.

11. The method of claim 1, wherein the step of forming comprises forming standardized test shapes, and further comprising the step of certifying the standardized test shapes.

12. A method of preparing cementitious compositions comprising the steps of:
    collecting one part spent residue from a fluidized combustion bed;
    adding liquid water to the one part spent residue sufficient to form conditioned spent residue;

adding 0.4–0.8 parts pozzolanic material to the one part conditioned spent residue to form a blend;

adding liquid water at ambient temperature to the blend to form a blend product;

forming the blend product into a shape;

curing the shape at ambient temperature while maintaining the shape saturated with liquid water.

13. A method of preparing a shaped cementitious composition comprising the steps of:

admixing conditioned spent bed material and fly ash at a ratio between 1.0:0.4 to 1.0:0.8 to form a blend;

adding controlled amounts of water to the blend to form a blend product;

forming the blend product into a shaped article; and curing the shaped article while maintaining ambient temperature and while saturating the shaped article with liquid water until the shaped article exhibits a dimensional change of less than about 0.0001 inches/inch per day.

14. The method of claim 13, wherein the step of forming the blend comprises pelletizing.

15. The method of claim 13, wherein the step of forming the blend comprises extruding a block and further comprising the step of crushing the block after curing.

16. A cementitious composition comprising gypsum and calcium hydroxide formed from a blend consisting essentially of: spent bed material; and a pozzolanic material comprising aluminum oxide and silicon dioxide, hydrated with liquid water, wherein the blend is formed into a shaped article and cured at ambient temperature while saturated with liquid water until the shaped article exhibits a dimensional change of about 0.0001 inches/inch per day or less.

17. The composition of claim 16, wherein the dimensional change is approximately zero.

18. The composition of claim 16, wherein the pozzolanic material comprises fly ash.

19. The composition of claim 16 in the form of a pellet.

20. The composition of claim 16 in the form of a synthetic aggregate material formed by crushing a cured shape.

21. A dimensionally stable synthetic aggregate formed from a blend of spent bed material and fly ash, the blend comprising reactants comprising: calcium oxide, calcium suphate, aluminum oxide, and silicon dioxide, wherein the spent bed materials and fly ash are in a ratio chosen from a stoichiometric balance of the reactants such that when the blend is formed, the amount of fly ash is at least sufficient to substantially exhaust the calcium oxide and calcium sulphate during the formation of one or more hydrated forms of chemical reaction products while maintaining an excess of aluminum oxide and silicon dioxide, the blend having a weight ratio of 1 to 0.4–0.8 between the spent bed material and fly ash.

22. A method of certifying a dimensionally stable synthetic aggregate formed from a blend of spent bed material and fly ash, comprising the steps of:

forming a plurality of standardized test shape samples;

testing one of said plurality at a first time to determine an initial value of X-ray diffraction pattern, percent weight loss on ignition and oven dry weight;

testing another of said plurality after an interval to determine a revised value for at least one of an X-ray diffraction pattern, percent weight loss on ignition and oven dry weight; and determining whether the synthetic aggregate is dimensionally stable by comparing the initial value and the revised value.

* * * * *